(12) United States Patent
Shimotsu

(10) Patent No.: US 8,641,607 B2
(45) Date of Patent: Feb. 4, 2014

(54) LIGHT-GUIDE, LIGHT SOURCE APPARATUS AND ENDOSCOPE SYSTEM

(75) Inventor: Shinichi Shimotsu, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 962 days.

(21) Appl. No.: 12/705,855

(22) Filed: Feb. 15, 2010

(65) Prior Publication Data
US 2010/0210910 A1 Aug. 19, 2010

(30) Foreign Application Priority Data
Feb. 16, 2009 (JP) ................. 2009-032307

(51) Int. Cl.
*A61B 1/06* (2006.01)
*F21V 7/04* (2006.01)
*G02B 6/44* (2006.01)

(52) U.S. Cl.
USPC ............. 600/178; 600/182; 362/556; 385/43

(58) Field of Classification Search
USPC .................. 396/182, 178; 362/556, 574, 554; 385/43
See application file for complete search history.

(56) References Cited

U.S. PATENT DOCUMENTS

| | | | |
|---|---|---|---|
| 5,852,692 A | 12/1998 | Nightingale et al. | |
| 7,059,778 B2 | 6/2006 | Suzuki et al. | |
| 2006/0030753 A1 | 2/2006 | Boutillette et al. | |

FOREIGN PATENT DOCUMENTS

| | | |
|---|---|---|
| JP | 52-149133 A | 12/1977 |
| JP | 56-101114 A | 8/1981 |
| JP | 57-129037 A | 8/1982 |
| JP | 62-287215 A | 12/1987 |
| JP | 04-241830 A | 8/1992 |
| JP | 2000-199864 A | 7/2000 |
| JP | 2003-322730 A | 11/2003 |

OTHER PUBLICATIONS

First Office Action, dated Jul. 23, 2012, issued in corresponding CN Application No. 201010180902.X, 10 pages in English and Chinese.
Notification of Reasons for Refusal, dated May 30, 2012, issued in corresponding JP Application No. 2009-032307, 5 pages in English and Japanese.

*Primary Examiner* — Rochelle-Ann J Blackman
(74) *Attorney, Agent, or Firm* — Sughrue Mion, PLLC

(57) ABSTRACT

When light enters a first small diameter fiber at an incident angle of 0°, exit light from the first small diameter fiber has a substantially convex light amount distribution in a diameter direction. When light enters a second small diameter fiber at an incident angle of 12°, exit light from the second small diameter fiber has a substantially concave light amount distribution in a diameter direction. The exit light from the first and second small diameter fibers enters a large diameter fiber and is combined therein, making the light amount distribution uniform in the large diameter fiber. The large diameter fiber has a tapered core and a tapered clad in a light exit section. The light in the large diameter fiber is output from a light exit surface thereof and also leaked from the tapered clad.

9 Claims, 12 Drawing Sheets

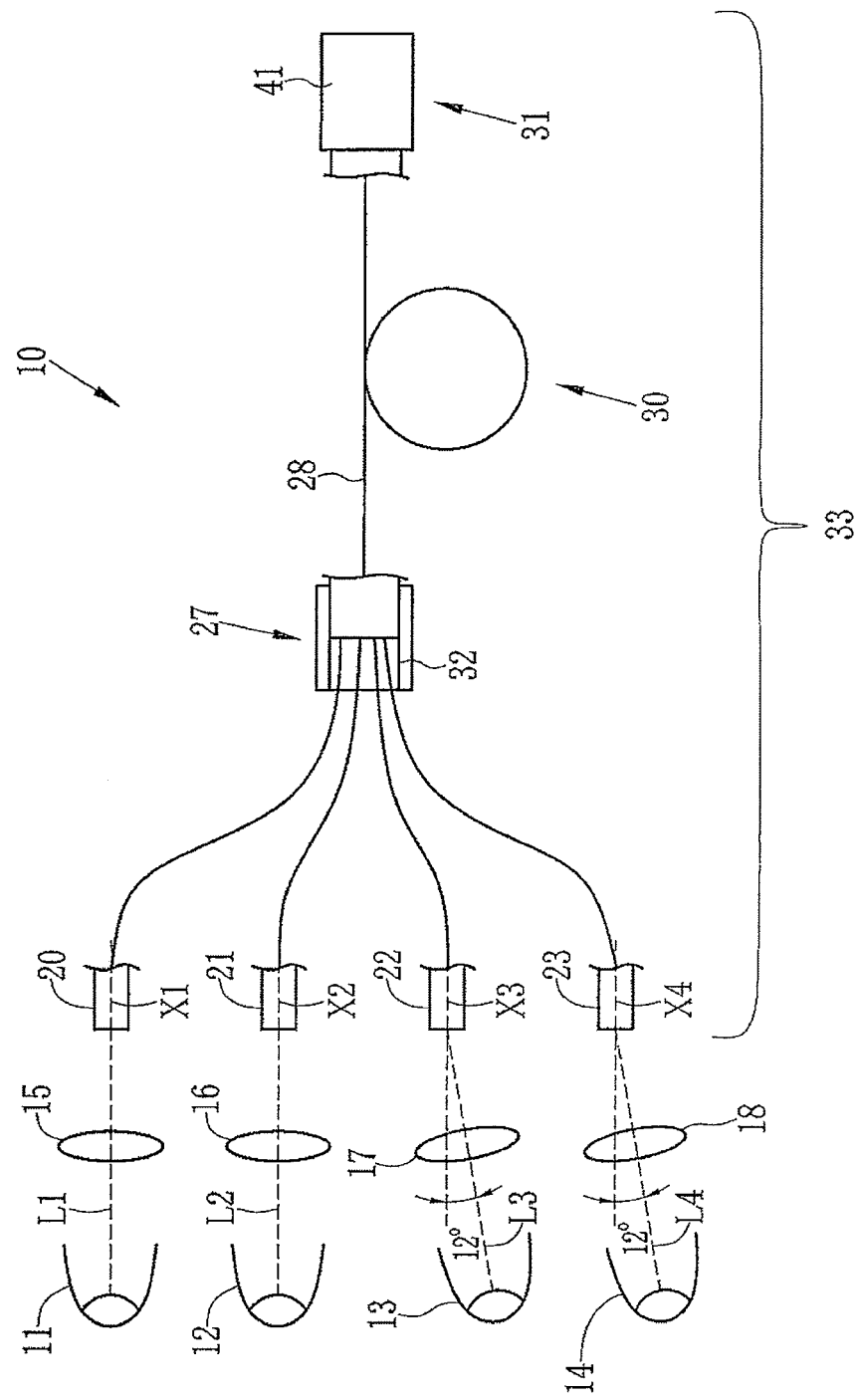

FIG. 6
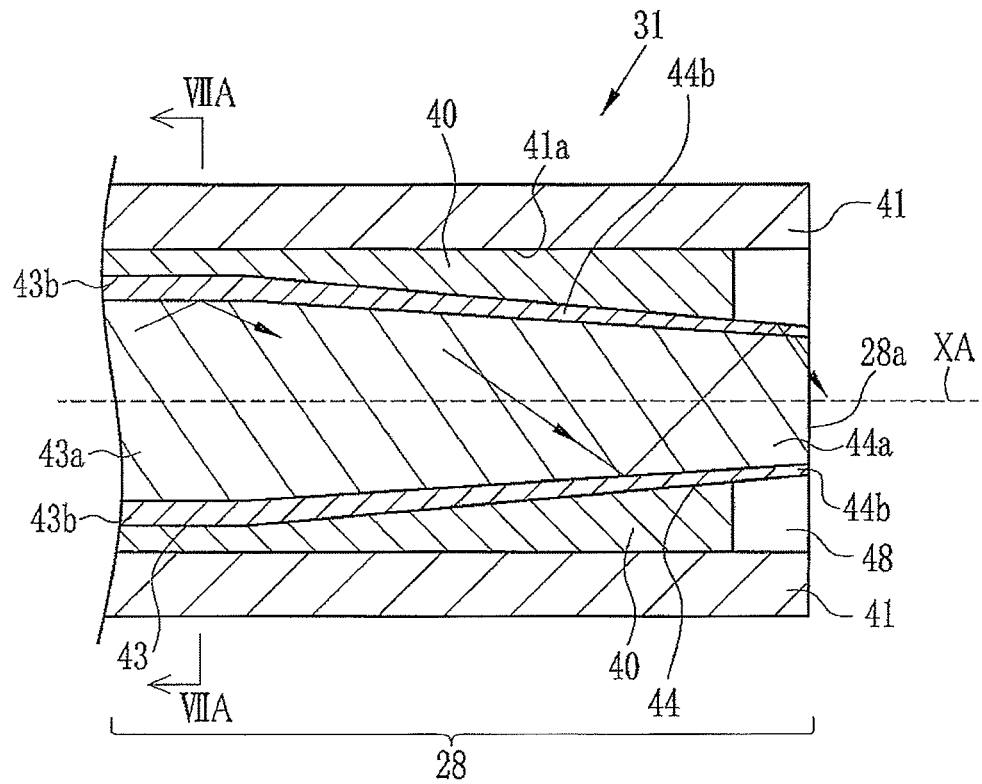
FIG. 7A
FIG. 7B
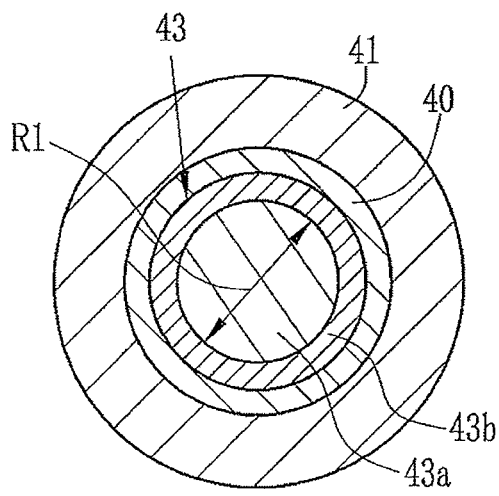
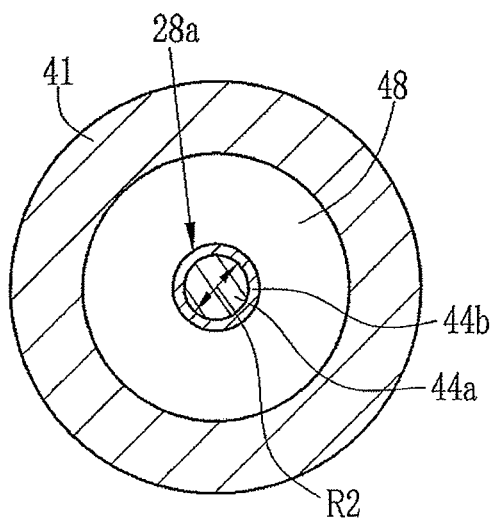

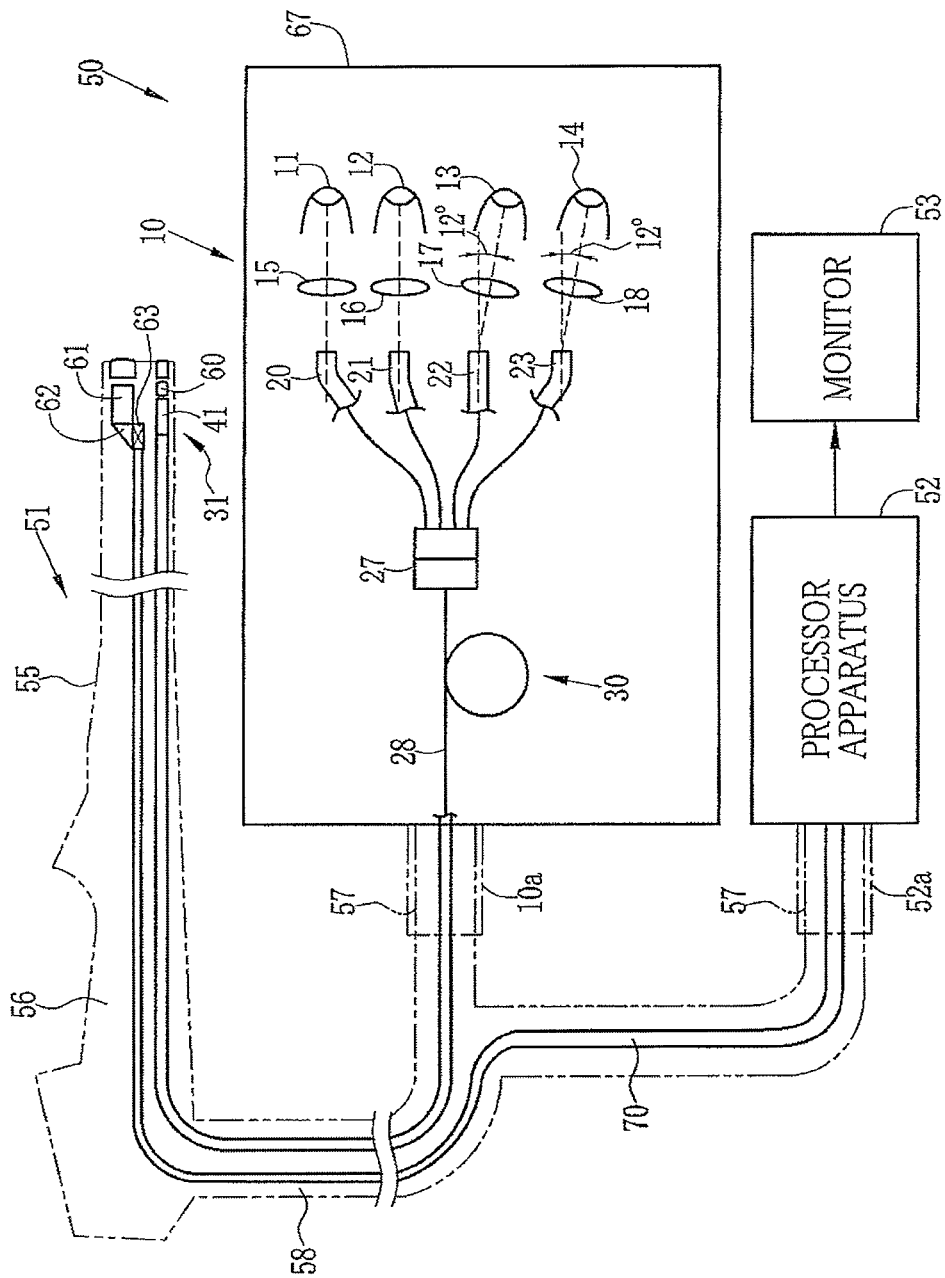

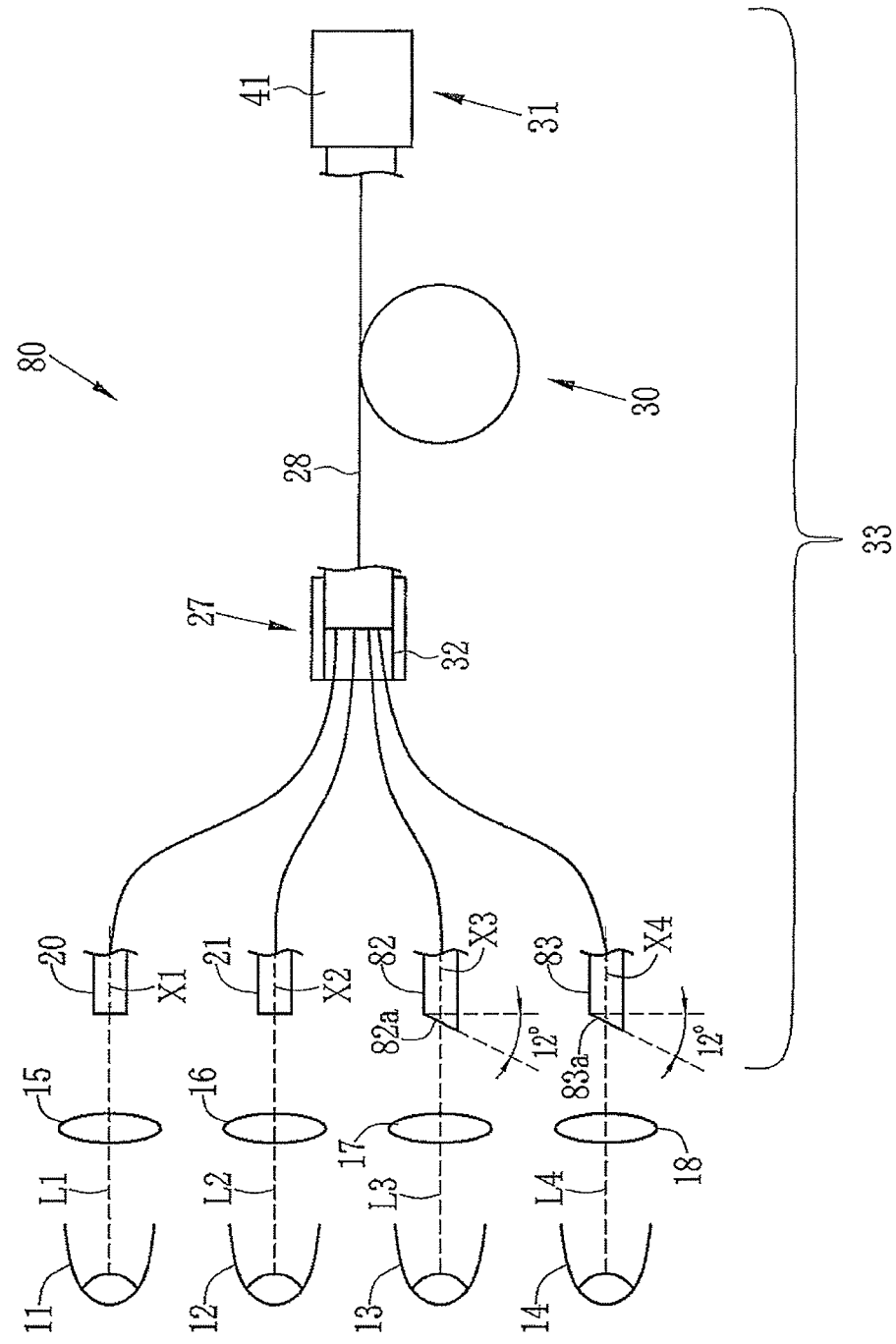

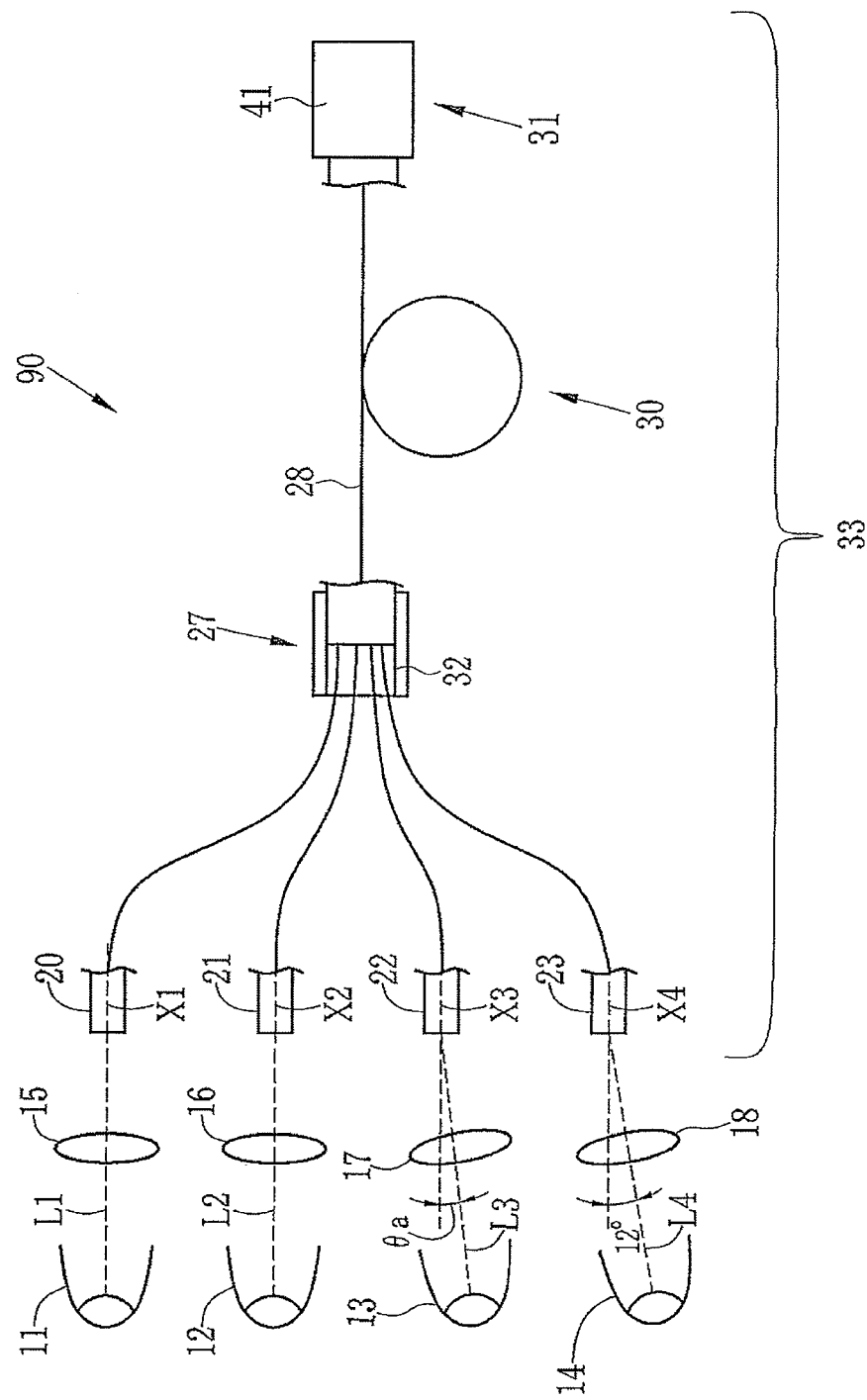

LIGHT-GUIDE, LIGHT SOURCE APPARATUS AND ENDOSCOPE SYSTEM

FIELD OF THE INVENTION

The present invention relates to a light guide for use in exposure of a semiconductor wafer and illumination of an endoscope. The present invention also relates to a light source apparatus and an endoscope system using this light guide.

BACKGROUND OF THE INVENTION

Various optical fibers such as a bundle fiber, in which a plurality of optical fibers are bundled together, and a large diameter fiber having a diameter larger than a standard optical fiber are used for data signal communications. In addition, for example, such optical fiber is used as a light guide in an exposure device for a semiconductor wafer. The light guide guides exposure light to a light exit section to expose the semiconductor wafer to the exposure light (see U.S. Pat. No. 7,059,778, corresponding to Japanese Patent Laid-Open Publication No. 2003-322730). In a light source apparatus of an endoscope, an optical fiber is used as a light guide which guides illumination light to a distal end of the endoscope so as to illuminate a body cavity of a patient (see Japanese Patent Laid-Open Publication No. 2000-199864).

In the case where the optical fiber is used as the light guide for guiding the exposure light as described in U.S. Pat. No. 7,059,778, a desired resist pattern cannot be produced if the radiation of light on the wafer is not uniform. In the case where the optical fiber is provided in the endoscope as the light guide for illumination as described in Japanese Patent Laid-Open Publication No. 2000-199864, it becomes difficult to find a lesion if the light guided by the light guide has nonuniform light amount distribution and such light reflects off an object of interest having high reflectivity or uneven surfaces, because an image taken with the endoscope also becomes uneven in brightness.

Conventionally, to increase uniformity of the light amount distribution of light from a light guide, the number of optical fibers for forming a bundle fiber is increased. Alternatively or in addition, in U.S. Pat. No. 7,059,778, a position of exit light and its light amount distribution are detected at a light exit surface of the optical fiber, and the light amount distribution of the light incident on the optical fiber is controlled in accordance with the detection results. In Japanese Patent Laid-Open Publication No. 2000-199864, the uniformity of a light amount distribution of exit light from an optical fiber is increased across its diameter direction by shifting a direction of a light incident end of the optical fiber to a direction orthogonal to an optical axis.

However, in U.S. Pat. No. 7,059,778, a device for detecting the position or the light amount distribution of the exit light, or a device for controlling the light amount distribution is required. In Japanese Patent Laid-Open Publication No. 2000-199864, a mechanism to shift the light incident end of the optical fiber is required. In either case, the light guide is upsized and additional cost is required for increasing the uniformity of the light amount distribution.

Generally, in a case where light is incident on a multimode optical fiber through which light of various modes is propagated, or where multimode optical fibers are optically connected, light (laser) is input or the multimode optical fibers are optically connected at an angle not more than a numerical aperture (NA) of the optical fiber, namely, an acceptance angle of the optical fiber, in view of stabilizing the incident light or the connection of the multimode optical fibers. Accordingly, the exit light from the center portion of the multimode optical fiber has higher light amount than the exit light from a peripheral portion thereof. Thus, the light amount distribution at the light exit surface of the multimode optical fiber is not uniform.

SUMMARY OF THE INVENTION

An object of the present invention is to provide a light guide, a light source apparatus and an endoscope system for increasing uniformity of a light amount distribution of exit light without cost and without upsizing the apparatus.

Another object of the present invention is to provide a light guide, a light source apparatus and an endoscope system for illuminating a large area with the exit light.

In order to achieve the above and other objects, a light guide of the present invention includes a first multimode optical fiber, a second multimode optical fiber and a bundling section. Light is incident on the first multimode optical fiber such that exit light from the first multimode optical fiber has a convex light amount distribution having a high light amount in its center portion in a diameter direction of the first multimode optical fiber. The first multimode optical fiber has a first core and a first clad covering an outer circumferential surface of the first core. The first core has a first tapered core whose diameter decreases toward the light exit surface. The first clad has a first tapered clad whose outer circumferential surface is inclined to be tapered along an outer circumferential surface of the first tapered core toward the light exit surface. Light is incident on the second multimode optical fiber such that exit light from the second multimode optical fiber has a concave light amount distribution having a low light amount in its center portion in a diameter direction of the second multimode optical fiber. The second multimode optical fiber has a second core and a second clad covering an outer circumferential surface of the second core. The second core has a second tapered core whose diameter decreases toward the light exit surface. The second clad has a second tapered clad whose outer circumferential surface is inclined to be tapered along an outer circumferential surface of the second tapered core toward the light exit surface. The bundling section bundles at least light exit surface sides of the first and second multimode optical fibers to form a bundle surface of a bundle fiber.

It is preferable that an incident angle of the light on a light incident surface of the second multimode optical fiber is larger than an incident angle of the light on a light incident surface of the first multimode optical fiber. It is preferable that each of the first and the second multimode optical fibers has an acceptance angle θ, and the incident angle of the light on the light incident surface of the first multimode optical fiber is not less than 0° and not more than θ/2, and the incident angle of the light on the light incident angle of the second multimode optical fiber is not less than θ/2 and not more than θ.

It is preferable that a light incident surface of the first multimode optical fiber is inclined relative to a surface orthogonal to an optical axis of the first multimode optical fiber, and a light incident surface of the second multimode optical fiber is inclined relative to a surface orthogonal to an optical axis of the second multimode optical fiber. An inclination angle of a light incident surface of the second multimode optical fiber is larger than an inclination angle of a light incident surface of the first multimode optical fiber. It is preferable that each of the first and the second multimode optical fibers has an acceptance angle θ, and the inclination angle of the first multimode optical fiber is not less than 0° and not more than θ/2, and the inclination angle of the second multimode optical fiber is not less than θ/2 and not more than θ.

It is preferable that a numerical aperture (NA) of each of the first, the second and the third multimode optical fibers is not less than 0.2.

It is preferable that a total number of the first and the second multimode optical fibers is at most 19. It is preferable that a diameter of each of the first and the second multimode optical fibers is not more than 1 mm.

In a preferred embodiment of the present invention, a light guide has a first multimode optical fiber, a second multimode optical fiber, a bundling section and a large-diameter multimode optical fiber. The light is incident on the first multimode optical fiber such that exit light from the first multimode optical fiber has a convex light amount distribution having a high light amount in its center portion in a diameter direction of the first multimode optical fiber. The light is incident on the second multimode optical fiber such that exit light from the second multimode optical fiber has a concave light amount distribution having a low light amount in its center portion in a diameter direction of the second multimode optical fiber. The bundling section bundles at least light exit surface sides of the first and second multimode optical fibers to form a bundle surface of a bundle fiber. The large-diameter multimode optical fiber has a larger light incident surface than the bundle surface. Light from the first and the second multimode optical fibers enters the light incident surface of the large-diameter multimode optical fiber. The large-diameter multimode optical fiber has a core and a clad covering an outer circumferential surface of the core. The core has a tapered core whose diameter decreases toward the light exit surface. The clad has a tapered clad whose outer circumferential surface is inclined to be tapered along an outer circumferential surface of the tapered core toward the light exit surface.

It is preferable that the light guide further includes a speckle reducer. The speckle reducer reduces speckle of the light to be output from the large-diameter multimode optical fiber.

It is preferable that the light guide further includes a tubular housing and a transparent adhesive member. The large-diameter multimode optical fiber is inserted through the tubular housing. The transparent adhesive member is provided between the housing and an outer circumferential surface of the clad. The adhesive member retains the large-diameter multimode optical fiber in the housing. The adhesive member has a lower refractive index than the clad. The adhesive member has a light passing space hollowed out to a predetermined depth from the light exit surface so as to expose at least a part of the outer circumferential surface of the tapered clad to air.

A light source apparatus of the present invention includes at least a first light source and a second light source, a first multimode optical fiber, a second multimode optical fiber, a bundling section and a light exit section. The first multimode optical fiber has a first light incident surface facing the first light source, and a first light exit surface for outputting first exit light of a convex light amount distribution having a high light amount in its center portion in a diameter direction of the first multimode optical fiber. The first light incident surface is orthogonal to an optical path of the first light source. The first multimode optical fiber has a first core and a first clad covering an outer circumferential surface of the first core. The first core has a first tapered core whose diameter decreases toward the first light exit surface. The first clad has a first tapered clad whose outer circumferential surface is inclined to be tapered along an outer circumferential surface of the first tapered core toward the first light exit surface. The second multimode optical fiber has a second light incident surface facing the second light source, and a second light exit surface for outputting second exit light of a concave light amount distribution having a low light amount in its center portion in a diameter direction of the second multimode optical fiber. The second light incident surface is inclined relative to an optical path of the second light source. The second multimode optical fiber has a second core and a second clad covering an outer circumferential surface of the second core. The second core has a second tapered core whose diameter decreases toward the second light exit surface. The second clad has a second tapered clad whose outer circumferential surface is inclined to be tapered along an outer circumferential surface of the second tapered core toward the second light exit surface. The bundling section bundles at least the first and the second light exit surface sides of the first and the second multimode optical fibers to form a bundle surface of a bundle fiber. The light exit section outputs the first exit light and the second exit light from the bundle fiber.

An endoscope system of the present invention includes the light source apparatus, an endoscope and an image processing apparatus. The endoscope has an image sensor. The image sensor takes an image of a body cavity illuminated with the light from the light exit section. An image processing apparatus is connected to the endoscope. The processing apparatus processes a signal from the image sensor and forms an image.

According to the present invention, the uniformity of the light amount distribution of the exit light is increased and light is illuminated in a large area without additional cost and without upsizing the apparatus.

BRIEF DESCRIPTION OF THE DRAWINGS

The above and other objects and advantages of the present invention will be more apparent from the following detailed description of the preferred embodiments when read in connection with the accompanied drawings, wherein like reference numerals designate like or corresponding parts throughout the several views, and wherein:

FIG. 1 is a schematic view of a light source apparatus of the first embodiment of the present invention;

FIG. 6 is a cross-sectional view of a light exit section of the first embodiment of the present invention;

FIG. 7A is a cross-sectional view along a line VIIA-VIIA in FIG. 6;

FIG. 7B is an end view of an end surface containing a light exit surface of the light exit section;

FIG. 8 is a schematic view of an endoscope system of the present invention;

FIG. 9 is a schematic view of a light source apparatus of the second embodiment of the present invention;

FIG. 10 is a schematic view of a light source apparatus of the third embodiment of the present invention;

DESCRIPTION OF THE PREFERRED EMBODIMENTS

Figure 2A:
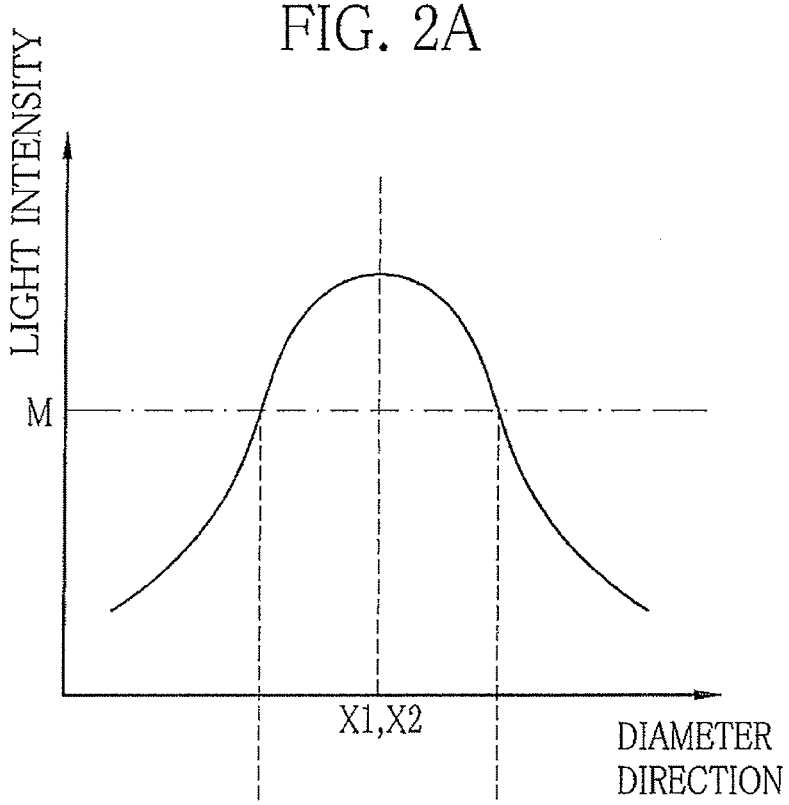
FIG. 2A shows a curve of light amount distribution of exit light from a small diameter fiber in a case where an incident angle is 0° (degree)

As shown in FIG. 1, a light source apparatus 10 of the first embodiment of the present invention has light sources 11 to 14, condenser lenses 15 to 18, small diameter optical fibers (hereinafter referred to as small diameter fibers) 20 to 23, a fiber connector 27 or bundling section or optical coupler, a large diameter optical fiber (hereinafter referred to as large diameter fiber) 28, a speckle reducer 30 and a light exit section 31 having an exit surface. The small diameter fibers 20 to 23 are bundled into a bundle fiber 32 using a ferrule or the like. A light guide 33 is composed of the bundle fiber 32 and the large diameter fiber 28. Since the light guide is an optical fiber that transmits light, any of the small diameter fibers 20 to 23 and the large diameter fiber 28 can be used as the light guide 33. This light guide 33 guides light emitted from the light sources 11 to 14 to the light exit section 31.

In FIG. 1, light exit ends of the small diameter fibers 20 to 23 are depicted as lines. However, each light exit end actually has a rod-like shape as with the light incident end. The light exit ends of the small diameter fibers 20 to 23 are inserted into the sleeve-like fiber connector 27 and bundled. The large diameter fiber 28 is also inserted into the fiber connector 27. Thus, the large diameter fiber 28 and the bundle fiber 32 of the small diameter fibers 20 to 23 are optically connected. Any bundling device capable of bundling optical fibers may be used for bundling the small diameter fibers 20 to 23.

In a case where the large diameter fiber 28 and the bundle fiber 32 of the small diameter fibers 20 to 23 are aligned with high precision, a well-known ferrule structure is used as the bundling device. A through hole is formed at the center of each of first and second ferrules. The light exit ends of the small diameter fibers 20 to 23 are inserted together into the through hole of the first ferrule, and fixed inside the through hole with a transparent adhesive. A light incident end of the large diameter fiber 28 is inserted into the through hole of the second ferrule and fixed inside the through hole with the transparent adhesive. The first and second ferrules are inserted into a sleeve-like adaptor from opposite sides. Thus, the large diameter fiber 28 and the bundle fiber 32 of the small diameter fibers 20 to 23 are connected.

The light source 11 and the condenser lens 15 have a common optical axis L1. The light source 12 and the condenser lens 16 have a common optical axis L2. The optical axis L1 coincides with an optical axis X1 of the small diameter fiber 20. The optical axis L2 coincides with an optical axis X2 of the small diameter fiber 21. Accordingly, light emitted from the light source 11 enters the small diameter fiber 20 via the condenser lens 15 at an incident angle of 0° (degree). Light emitted from the light source 12 enters the small diameter fiber 21 via the condenser lens 16 at an incident angle of 0°. It should be noted that the incident angles to the small diameter fibers 20 and 21 (both with an acceptance angle θ) are not limited to 0°. The incident angles may be not less than 0° and not more than θ/2.

The light source 13 and the condenser lens 17 have a common optical axis L3. The light source 14 and the condenser lens 18 have a common optical axis L4. The optical axis L3 is tilted at 12° relative to an optical axis X3 of the small diameter fiber 22. The optical axis L4 is tilted at 12° relative to an optical axis X4 of the small diameter fiber 23. Accordingly, light emitted from the light source 13 enters the small diameter fiber 22 via the condenser lens 17 at the incident angle of 12°. Light emitted from the light source 14 enters the small diameter fiber 23 via the condenser lens 18 at the incident angle of 12°. It should be noted that the incident angles of light on the light incident surfaces of the small diameter fibers 22 and 23 (both with the acceptance angle θ) are not limited to 12°. The incident angles of the light on the light incident surfaces of the small diameter fibers 22 and 23 are larger than the incident angles of the light on the light incident surfaces of the small diameter fibers 20 and 21. The incident angles of the light on the light incident surfaces of the small diameter fibers 22 and 23 are not less than θ/2 and not more than θ. In a case where a numerical aperture (hereinafter abbreviated as NA) of each of the small diameter fibers 20 to 23 is 0.22, θ is 12.7°.

Each of the small diameter fibers 20 to 23 and the large diameter fiber 28 is composed of a multimode optical fiber that propagates various modes of light. A diameter of the large diameter fiber 28 is larger than the diameter of the entire small diameter fibers 20 to 23 or the bundle fiber 32. Each of the small diameter fibers 20 to 23 and the large diameter fiber 28 is composed of a core, a clad surrounding the core and a protection layer covering the clad. An outer diameter of the large diameter fiber 28 including the protection layer is in a range from 2 mm to 40 mm. An outer diameter of the bundled small diameter fibers 20 to 23 or the bundle fiber 32 is in a range from 0.5 mm to 1.5 mm, and preferably 1 mm.

Figure 2B:
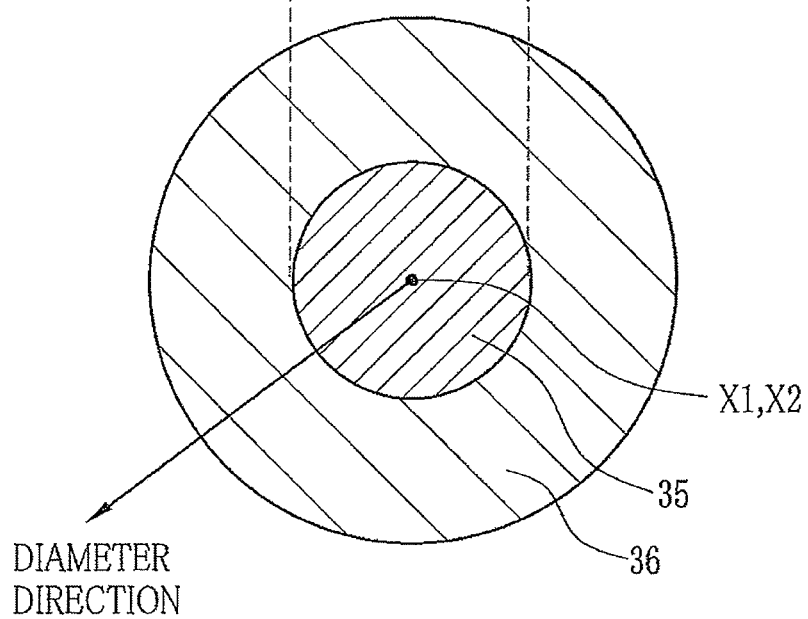
FIG. 2B shows an FFP (Far field pattern) of the exit light from the small diameter fiber of FIG. 2A.

Each of the small diameter fibers 20 and 21 receives light at an incident angle of 0°. As shown in FIG. 2A, each of the light amount distributions in the small diameter fibers 20 and 21 is Gaussian, namely, a substantially convex or bell-shaped distribution having its peak on the optical axis X1 or X2. The amount of light (light amount) decreases as a distance from the optical axis X1 or X2 increases. As shown in FIG. 2B, each of the far field patterns (hereinafter abbreviated as FFP) of the exit light from the small diameter fibers 20 and 21 has an area 35 and an area 36. The area 35 having the light amount not less than a predetermined value M is located within a predetermined distance from the optical axis X1 or X2 in the diameter direction of the small diameter fiber 20 or 21. The area 36 having the light amount less than the predetermined value M is located outside the area 35. The light amount distributions and the FFPs of the exit light at the incident angles in a range from 0° to 6° are substantially the same as those at the incident angle of 0°. In addition, two or more beams of light which differ in the light amount distributions of the exit light may be incident on the small diameter fiber(s).

Figure 3A:
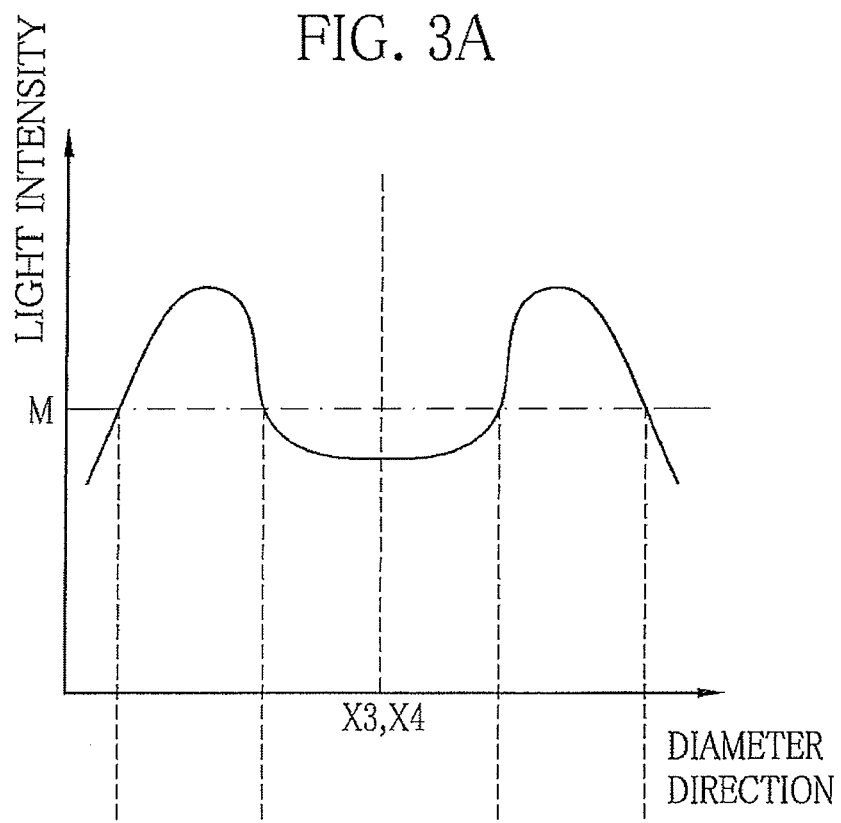
FIG. 3A shows a curve of light amount distribution of exit light from a small diameter fiber in a case where the incident angle is 12°.
Figure 3B:
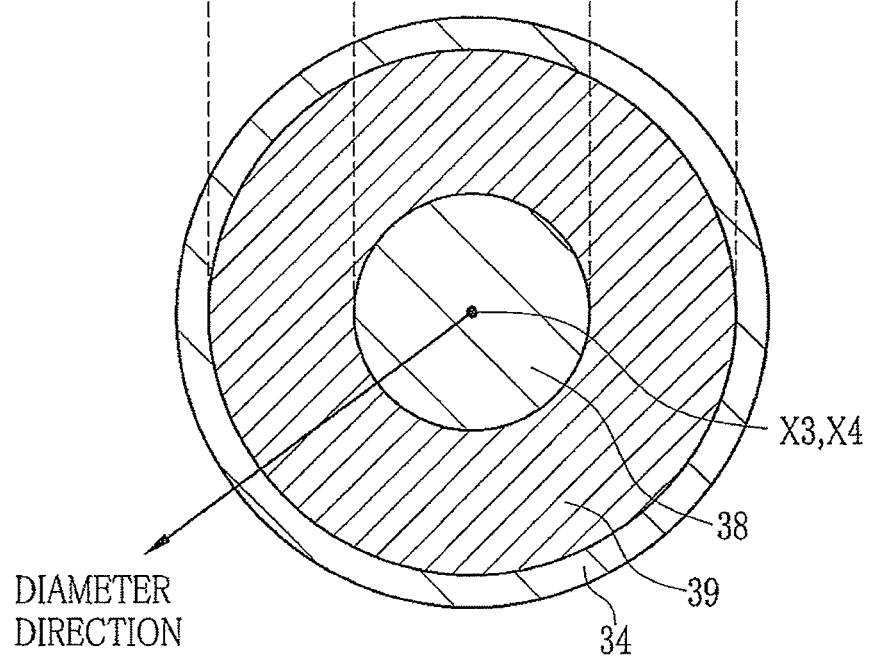
FIG. 3B shows an FFP of the exit light from the small diameter fiber of FIG. 3A.

On the other hand, the small diameter fibers 22 and 23 receive light at the incident angle of 12°. As a result, as shown in FIG. 3A, each of the light amount distributions of the small diameter fibers 22 and 23 shows a substantially concave curve (an annular or ring-shape radiation pattern) in which the light amount of a center portion containing the optical axis X3 or X4 is smaller than the light amount of its peripheral portion in the diameter direction. As shown in FIG. 3B, each of the FFPs of the exit light from the small diameter fibers 22 and 23 has an area 34, an area 38, and an area 39. The area 38 is located within a predetermined distance from the optical axis X3 or X4 in the diameter direction of the small diameter fiber 22 or 23 and has the light amount less than the predetermined value M. The area 39 surrounds the area 38 and has the light amount not less than the value M. The area 34 surrounds the area 39 and has the light amount less than the value M.

Figure 4A:
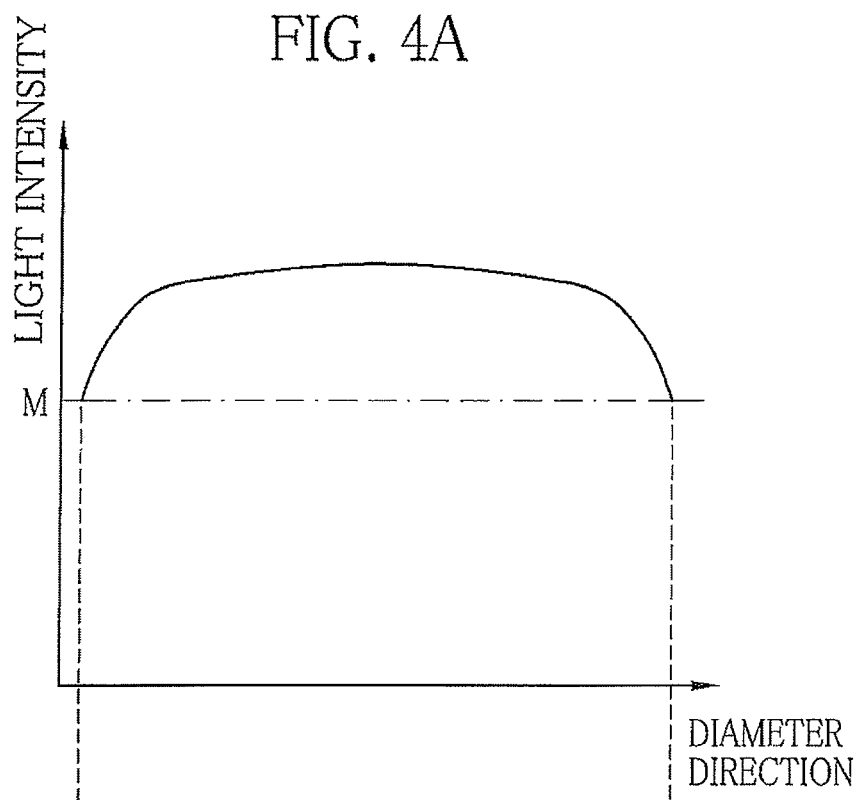
FIG. 4A shows a curve of light amount distribution of exit light from a light exit section.
Figure 4B:
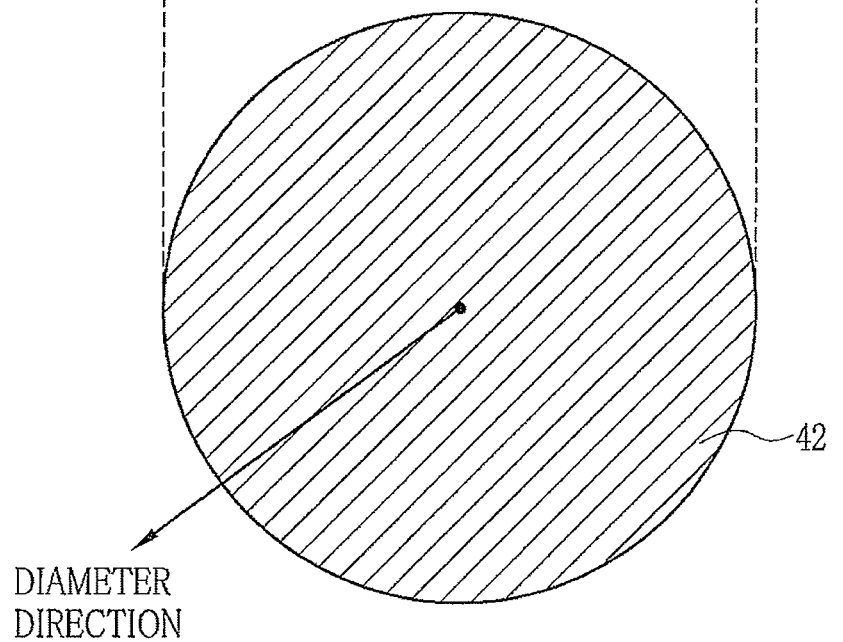
FIG. 4B shows an FFP of the exit light from the light exit section of FIG. 4A.

As shown in FIG. 1, the fiber connector 27 connects a light exit surface or bundle surface of the bundled small diameter fibers 20 to 23 or bundle fiber 32, and a light incident surface of the large diameter fiber 28 via a protection medium (not shown). The exit light from the small diameter fibers 20 to 23 enters the large diameter fiber 28. In the large diameter fiber 28, the exit light from the small diameter fibers 20 and 21 each having the substantially convex light amount distribution, and the exit light from the small diameter fibers 22 and 23 each having substantially concave light amount distribution are combined. Thereby, as shown in FIG. 4A, the exit light from the large diameter fiber 28 has a substantially uniform flat-top light distribution with the light amount not less than a predetermined value M across its diameter direction. As shown in FIG. 4B, an entire area 42 of the FFP of the exit light from the large diameter fiber 28 has the light amount not less than the value M.

Figure 5B:
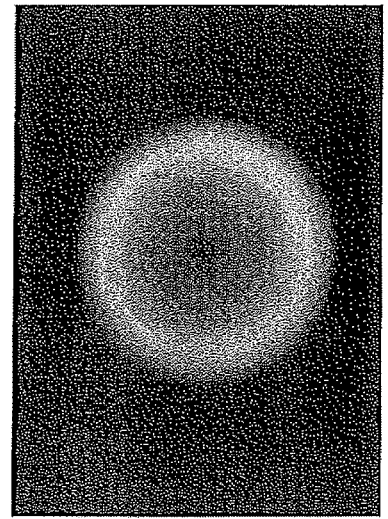
FIG. 5B shows a radiation pattern (FFP) of exit light from the small diameter in a case where the incident angle is 12°.
Figure 5D:
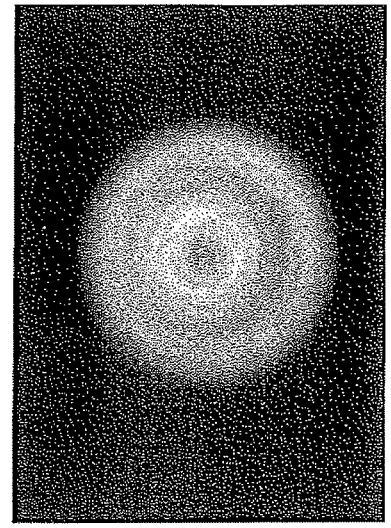
FIG. 5D shows a radiation pattern (FFP) on which the exit light shown in FIG. 5A and the exit light shown in FIG. 5B or Figure C are combined.
Figure 5A:
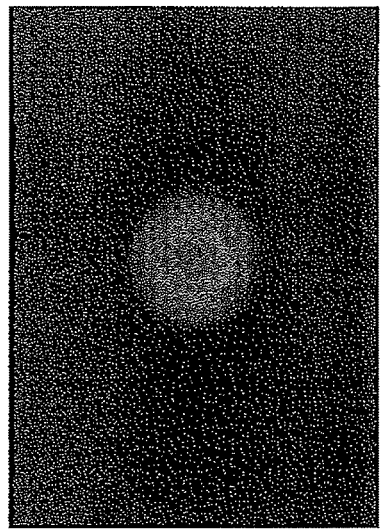
FIG. 5A shows a radiation pattern (FFP) of exit light from the small diameter fiber in a case where the incident angle is 0°.
Figure 5C:
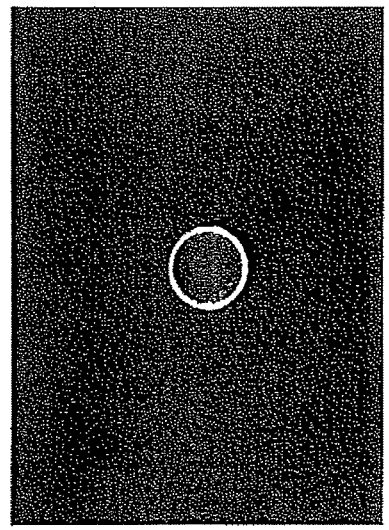
FIG. 5C shows a radiation pattern (NFP) of exit light from the small diameter fiber in a case where the incident angle is 12°.

FIG. 5A shows the FFP of the exit light radiated on a screen from each of the light exit surfaces of the small diameter fibers 20 and 21 on which light is incident at the incident angle of 0°. White portions indicate where the light amount is high. FIG. 5B shows the FFP of the exit light radiated on the screen from each of the light exit surfaces of the small diameter fibers 22 and 23 on which light is incident at the incident angle of 12°. FIG. 5C is a near field pattern (hereinafter abbreviated as NFP) of the exit light from each of the small diameter fibers 22 and 23 at the light exit surfaces thereof. It is found according to the radiation patterns in the drawings that the light amount is larger in the peripheral portion than in the center portion. Components of light depicted in FIG. 5A and FIGS. 5B and 5C become incident upon the large diameter fiber 28, and then are combined with one another in the large diameter fiber 28. FIG. 5D shows that the light amount distribution of the exit light from the light exit section 31 is substantially uniform.

As described above, in the present invention, the light is incident on the small diameter fibers 20 and 21 such that the substantially convex light amount distributions are formed, and the light is incident on the small diameter fibers 22 and 23 such that the substantially concave light amount distributions are formed. The light having the substantially convex light amount distributions and the light having the substantially concave light amount distributions are combined. Thus, the uniformity of the light amount distribution of the exit light from the light exit section 31 is increased.

The present invention makes the light amount distribution uniform without specific devices. Accordingly, the apparatus of the present invention is prevented from upsizing, and does not require additional cost. Conventionally, after the replacement of the bundle fiber or the entire light guide, readjustments of control systems of the apparatuses for increasing the uniformity of the light amount distribution are necessary. The present invention, on the other hand, only needs to set incident angles of the small diameter fibers 20 to 23. As a result, the time required for replacing the bundle fiber or the entire light guide is shortened compared with the conventional apparatuses. The present invention is particularly effective in cases where the light guide is frequently replaced, such as the light guide for illumination provided in an endoscope.

Conventionally, at least a few hundreds of optical fibers are necessary to make the light amount distribution of a bundle fiber uniform due to the increase in the number of the optical fibers bundled in the bundle fiber. The present invention, on the other hand, requires at least two and at most 19 optical fibers to make the light amount distribution uniform. The NA of each of the small diameter fibers 20 to 23 and the large diameter fiber 28 is not less than 0.2. The light amount in a peripheral portion in the diameter direction of the large diameter fiber 28 is further increased by setting the NA of each of the small diameter fibers 20 to 23 and the large diameter fiber 28 not less than 0.2. In a case where the light amount in the peripheral portion is not large enough, the light amount distribution is made uniform by combining light having a substantially concave light amount distribution with increased light amount in the peripheral portion.

Although the small diameter fiber and the large diameter fiber differ in diameter, the radiation pattern, for example, a ring-shape radiation pattern, of the exit light from the small diameter fiber maintains its size and shape in the large diameter fiber. Conventionally, it is difficult to make the light amount distribution uniform unless the diameter of the optical fiber is at least 10 mm. The present invention, however, makes the light amount distribution uniform even if the diameter of the small diameter fiber is not more than 1 mm.

As shown in FIG. 1, in the speckle reducer 30, the large diameter fiber 28 with several turns is vibrated to reduce speckle noise so as to further increase the uniformity of the light amount distribution. Thereby, the exit light with more uniform light amount distribution is output from the light exit section 31. As a result, occurrence of the speckle noise is reduced.

In FIG. 6, in the light exit section 31, the large diameter fiber 28 is retained inside a retaining hole 41a of the tubular housing 41. The light passed through the speckle reducer 30 is output from the light exit section 31. The large diameter fiber 28 inside the tubular housing 41 is provided with a fiber body 43 and a tapered section 44. The fiber body 43 has a constant diameter in an optical axis direction XA. The tapered section 44 gradually tapers in the diameter direction toward a light exit surface 28a of the light exit section 31. The fiber body 43 is composed of a core 43a and a clad 43b. The clad 43b is provided on an outer circumferential surface of the core 43a, and has a constant thickness. The tapered section 44 is composed of a tapered core 44a and a tapered clad 44b provided on an outer circumferential surface of the tapered core 44a. The diameter of the tapered core 44a gradually decreases or tapers toward the light exit surface 28a. An outer circumferential surface of the tapered clad 44b is inclined to be tapered along the outer circumferential surface of the tapered core 44a toward the light exit surface 28a. The thickness of the tapered clad 44b decreases as it becomes closer to the light exit surface 28a. However, the tapered clad 44b may have a constant thickness. It is preferable that the tubular housing 41 is made from glass or the like.

In the fiber body 43, light propagates through the core 43a by total internal reflection at the interface between the core 43a and the clad 43b. On the other hand, in the tapered section 44, the light incident angle onto the tapered clad 44b becomes small. As a result, light not totally reflected at the interface between the core 43a and the clad 43b leaks to the tapered clad 44b. The outer circumferential surface of the tapered clad 44b contacts with a transparent adhesive member 40. The refractive index of the adhesive member 40 is lower than that of the tapered clad 44b. Accordingly, the light leaked to the tapered clad 44b is reflected off the interface between the tapered clad 44b and the adhesive member 40 by total internal reflection and is again transmitted through the tapered section 44.

As shown in FIG. 7A, a core outer diameter R1 of the fiber body 43 is not less than 225 μm and not more than 235 μm, and more preferably 230 μm. As shown in FIG. 7B, a core outer diameter R2 of the tapered section 44 at the light exit surface 28a is not less than 85 μm and not more than 100 μm, and more preferably 93 μm. A taper rate (tip-to-base diameter ratio of core outer diameter R2/core outer diameter R1) of the tapered section 44 is not less than 0.36 and not more than 0.44. It is preferable that a clad diameter of the large diameter fiber 28 is not less than 105 μm and not more than 255 μm.

The adhesive member 40 is composed of an optically transmissive adhesive, and hardened or cured with UV rays. As shown in FIG. 6, the adhesive member 40 attaches the large diameter fiber 28 in the retaining hole 41a such that the entire outer circumferential surface of the tapered clad 44b is exposed to air to a predetermined distance or depth from the light exit surface 28a. A refractive index of the adhesive member 40 is lower than those of the clad 43b and the tapered clad 44b of the large diameter fiber 28. Specifically, the refractive index (or indices) of the clad 43b and the tapered clad 44b is not less than 1.43 and not more than 1.44. It is preferable that the refractive index of the adhesive member 40 is not less than 1.40 and not more than 1.41.

A light passing space 48 is a ring-like space or end opening defined between an inner circumferential surface (inner surface) of the tubular housing 41 and an outer circumferential surface (hereinafter referred to as exposed area) of the tapered clad 44b which is exposed to a predetermined depth from the light exit surface 28a. The exposed area of the tapered clad 44b directly contacts with air in the light passing space 48. A critical angle for the total internal reflection at the interface between the tapered clad 44b and the light passing space 48 is larger than a critical angle at the interface between the tapered clad 44b and the adhesive member 40.

In the present invention, the divergence angle and the NA of the exit light are not restricted by the refractive indices of the core 43a, the tapered core 44a, the clad 43b, the tapered clad 44b, and the adhesive member 40. Instead, the divergence angle and the NA of the exit light can be adjusted to desired values by changing a taper rate of the tapered section 44 and the depth of the light passing space 48 in the optical axis direction XA, that is, the length of the exposed tapered clad 44b in the optical axis direction XA. It is possible to achieve the NA of at least 0.35 depending on the settings of the refractive indices of the core 43a, the tapered core 44a, the clad 43b and the tapered clad 44b.

Hereinafter, the increases in the divergence angle and the NA are described by comparing their numerical values in a case where neither the light passing space 48 nor the tapered section 44 is provided, in a case where only the tapered section 44 is provided, and in a case where both the light passing space 48 and the tapered section 44 are provided. In the case where neither the light passing space 48 nor the tapered section 44 is provided, the "NA1", that is, the maximum NA of a multimode optical fiber is calculated using the following mathematical expression (1) based on a refractive index Na of a core and a refractive index Nb of a clad.

$$NA1 = \sqrt{(Na^2 - Nb^2)} \quad (1)$$

For example, in a case where the refractive index Na of the core is 1.452 and the refractive index Nb of the clad is 1.436, the "NA1" is 0.22 and the maximum divergence angle is 24.2 degrees. Here, the core diameter of the fiber body 43 of the large diameter fiber 28 is 230 μm and the clad diameter thereof is 250 μm. In this case, the multimode optical fiber provided with neither the tapered section 44 (namely, the taper rate is 1.0) nor the light passing space 48 has a divergence angle of 16.0 degrees and the NA of 0.14.

On the other hand, in the case where only the tapered section 44 is provided, the "NA2", that is, the maximum. NA of a multimode optical fiber is calculated using the following mathematical expression (2) based on a refractive index Na of the core and a refractive index Nc of the adhesive member.

$$NA2 = \sqrt{(Na^2 - Nc^2)} \quad (2)$$

For example, in a case where the refractive index Na of the core is 1.452, as with the above, and the refractive index Nc of the adhesive member is 1.407, the "NA2" is 0.36 and the maximum divergence angle is 42.2 degrees. This divergence angle is obtained where all light in the tapered section 44 is leaked from the tapered core 44a to the tapered clad 44b. In a case where the fiber body 43 having the core diameter of 230 μm and the clad diameter of 250 μm is provided with the tapered section 44 having a taper rate of 0.372 and the core diameter of 93 μm at the light exit surface 28a, the divergence angle is 37.6 degrees and the NA is 0.32. Thus, the divergence angle and the NA can be increased only by providing the tapered section 44.

The present invention is applied to the fiber body 43 having the core diameter of 230 μm and the clad diameter of 250 μm. In a case both the light passing space 48 and the tapered section 44 (the taper rate is 0.372 and the core diameter is 93 μm at the light exit surface 28a) are provided, the divergence angle becomes 47.0 degrees and the NA becomes 0.40. Thus, with the light passing space 48 in addition to the tapered section 44, the divergence angle and the NA are further increased.

The light passing space 48 is formed as follows. First, the large diameter fiber 28 is inserted into the retaining hole 41a of the tubular housing 41. The adhesive member 40 is provided between the outer circumferential surface of the large diameter fiber 28 and the inner circumferential surface of the tubular housing 41 such that the edges of the light exit surface 28a and the tubular housing 41 are level with each other. The adhesive member 40 is composed of a UV hardening or UV curable adhesive. The adhesive member 40 is irradiated with UV rays and hardened or cured. Thus, the large diameter fiber 28 is attached in the retaining hole 41a. Thereafter, laser having a wavelength in the UV range to be absorbed by the adhesive member 40 is irradiated to the entire end surface of the adhesive member 40 from the light exit surface 28a side, and thereby the adhesive member 40 is removed or hollowed out to a constant depth from the light exit surface 28a, which is called ablation. As a result, the entire outer circumferential surface of the tapered clad 44b is exposed to air to the constant depth from the light exit surface 28a. The light passing space 48 of a substantially annular cylindrical shape or ring-shape is formed between the exposed outer circumferential surface of the tapered clad 44b and the inner circumferential surface of the tubular housing 41.

It is preferable to use a single laser beam in which four laser beams each having the wavelength of 405 nm and output of 300 mW are multiplexed (total output is 1.2 W). It is preferable that the time required for the removal of the adhesive member 40 is approximately 5 minutes. Alternatively, laser with low power, for example, around 100 mW may be irradiated to the adhesive member 40 for a long time to alter the properties of the adhesive member 40. In this case, after the laser irradiation, the altered adhesive member 40 can be removed with a solvent such as acetone. Processing such as the removal of the adhesive is not normally performed after the edge polishing, because an edge, in this case, the light exit section 31 of an optical connector is extremely fragile. In this embodiment, however, a non-contact processing method using laser irradiation is adopted. This processing method does not damage the edge even if the processing is performed after the edge polishing.

As shown in FIG. 8, an endoscope system 50 uses the light source apparatus 10 of the present invention as an apparatus for generating illumination light to illuminate a body cavity of a patient. An image of the body cavity of the patient illuminated with the illumination light is taken with an endoscope 51. A processor apparatus 52 or image processing apparatus performs various processing to the taken image. Thereafter, the image is displayed on a monitor 53.

The endoscope 51 is provided with a flexible insert section 55 to be inserted in a body cavity of a patient, a handling section 56 provided at a base portion of the insert section 55 and used for operating the endoscope 51 with a hand, and a universal cord 58 for connecting universal connectors 57 and the handling section 56. The universal connectors 57 are connected to a socket 10a of the light source apparatus 10 and a socket 52a of the processor apparatus 52, respectively. In a distal end of the insert section 55, an illumination optical system 60, an objective optical system 61, a prism 62 and an image sensor 63 are provided.

In a casing 67 are provided the light sources 11 to 14, the condenser lenses 15 to 18, the small diameter fibers 20 to 23, the fiber connector 27, and the speckle reducer 30 of the light source apparatus 10. An end portion of the large diameter fiber 28 is located inside the casing 67, and extends through the universal cord 58 and the insert section 55.

The light from the light source 11 is incident on the small diameter fiber 20 at an incident angle of 0° via the condenser lens 15. The light from the light source 12 is incident on the small diameter fiber 21 at an incident angle of 0° via the condenser lens 16. The exit light from each of the small diameter fibers 20 and 21 has the substantially convex light amount distribution curve shown in FIG. 2A and the FFP shown in FIG. 2B. The light from the light source 13 is incident on the small diameter fiber 22 at an incident angle of 12° via the condenser lens 17. The light from the light source 14 is incident on the small diameter fiber 23 at an incident angle of 12° via the condenser lens 18. The exit light from each of the small diameter fibers 22 and 23 has the substantially concave light amount distribution curve shown in FIG. 3A and the FFP shown in FIG. 3B.

The exit light from the small diameter fibers 20 to 23 is output to the large diameter fiber 28 via the fiber connector 27. As shown in FIG. 4A, the light amount distribution of the light inside the large diameter fiber 28 is substantially uniform with the light amount not less than the predetermined value M across its diameter direction. In addition, as shown in FIG. 4B, the entire area 42 of the FFP of the large diameter fiber 28 has the light amount not less than the predetermined value M. The uniformity of the light amount distribution of the light inside the large diameter fiber 28 is further increased by the speckle reducer 30, and the light is transmitted to the light exit section 31.

The light exit section 31 irradiates the body cavity of the patient with the light transmitted from the large diameter fiber 28 via the illumination optical system 60. Since the light having the uniform light amount illuminates a large area, an image obtained with the endoscope 51 is sharp even if an object of interest in the body cavity has a high reflectivity or significantly uneven surfaces. As a result, it becomes easy to find a lesion in the acquired image.

Since the light exit section 31 has the light passing space 48 and the tapered section 44, the divergence angle and the NA of light from the light exit section 31 are larger than in the case where the light passing space 48 and the tapered section 44 are not provided. Accordingly, the body cavity is irradiated with the light over a large area such that a substantially entire imaging area of the image sensor 63 is illuminated. As a result, it becomes easy to find a lesion from an image taken with the endoscope.

The image light reflected off the body cavity forms an image on an imaging surface of the image sensor 63 via the objective optical system 61 and the prism 62. Thereby, image signals of the object of interest are obtained. The obtained image signals are transmitted to the processor apparatus 52 via a signal line 70 in the insert section 55 and the universal cord 58. The processor apparatus 52 performs various processing to the image signals transmitted through the signal line 70. The monitor 53 displays an image of the object of interest based on the processed image signals.

As shown in FIG. 9, a light source apparatus 80 of the second embodiment of the present invention has the same configuration as the light source apparatus 10 of the first embodiment shown in FIG. 1 except for small diameter fibers 82 and 83 each having an acceptance angle θ. The light source 13 and the condenser lens 17 have the common optical axis L3. The light source 14 and the condenser lens 18 have the common optical axis L4. The optical axis L3 coincides with an optical axis X3 of the small diameter fiber 82. The optical axis L4 coincides with an optical axis X4 of the small diameter fiber 83. Light incident surfaces 82a and 83a of the small diameter fibers 82 and 83 are ground or polished so as to be inclined 12° relative to planes orthogonal to the optical axes X3 and X4, respectively. In a case where each of the small diameter fibers 82 and 83 has the acceptance angle θ, each of the inclination angles of the light incident surfaces 82a and 83a of the small diameter fibers 82 and 83 may be not less than θ/2 and not more than θ relative to the plane orthogonal to the optical axes X3 or X4. In addition, each of the light incident surfaces of the small diameter fibers 20 and 21 may be ground or polished so as to be inclined at an inclination angle smaller than those of the light incident surfaces 82a and 83a of the small diameter fibers 82 and 83. The inclination angles of the light incident surfaces of the small diameter fibers 20 and 21 may be, for example, not less than 0° and not more than θ/2 relative to a plane orthogonal to the optical axis X1 or X2 in a case where each of the small diameter fibers 20 and 21 has the acceptance angle θ.

The small diameter fibers 82 and 83 are multimode optical fibers as with the small diameter fibers 20 and 21. Accordingly, when the light from the light sources 13 and 14 enters the light incident surfaces 82a and 83a inclined at the angle of 12° via the condenser lenses 17 and 18, respectively, the exit light from each of the small diameter fibers 82 and 83 has the substantially concave light amount distribution shown in FIG. 3A and the FFP shown in FIG. 3B.

The exit light from the small diameter fibers 20, 21, 82 and 83 enters the large diameter fiber 28 through the fiber connector 27. In the large diameter fiber 28, the exit light from the small diameter fibers 20, 21, 82 and 83 is combined and the uniformity of the combined exit light is increased. Thereby, as shown in FIG. 4A, the light in the large diameter fiber 28 has the substantially uniform light amount distribution with the light amount not less than the predetermined value M across its diameter direction. As shown in FIG. 4B, the entire area 42 of the FFP of the large diameter fiber 28 has the light amount not less than the predetermined value M. The uniformity of the light amount distribution of the light inside the large diameter fiber 28 is further increased by the speckle reducer 30.

As shown in FIG. 10, a light source apparatus 90 of the third embodiment of the present invention has the same configuration as the light source apparatus 10 of the first embodiment shown in FIG. 1 except for an incident angle θa of the small diameter fiber 22. In this embodiment, the incident angle θa is changed within a range from 0° to 12°.

Figure 11:
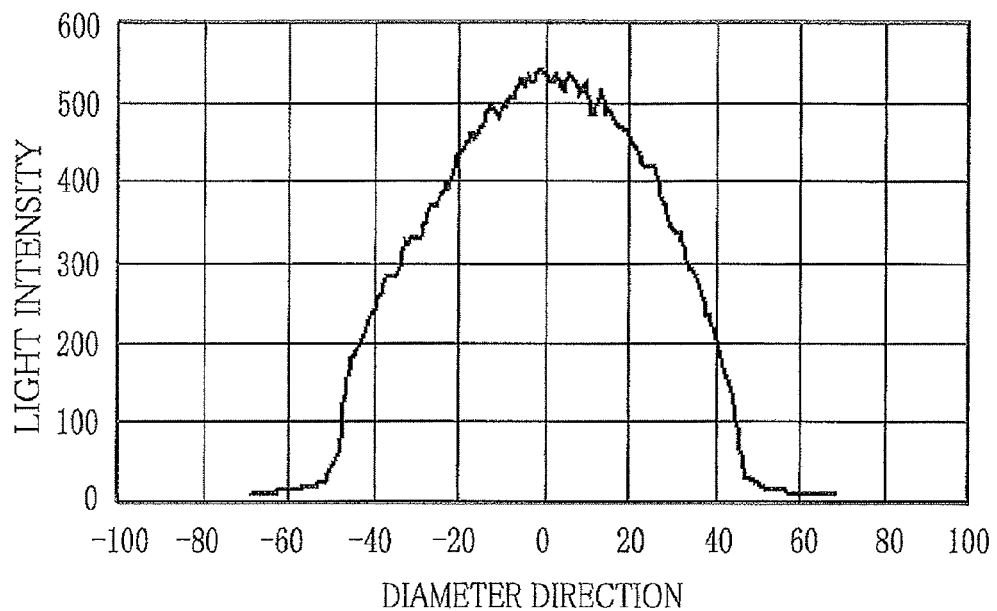
FIG. 11 shows a curve of light amount distribution (NFP) of exit light from the small diameter fiber in a case where the incident angle is 6°.
Figure 12:
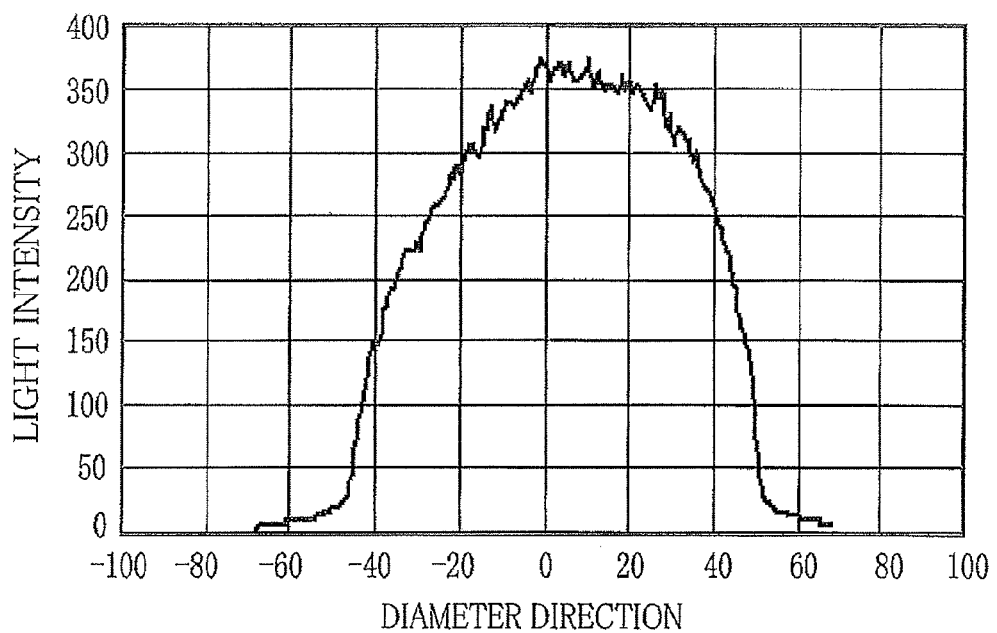
FIG. 12 shows a curve of light amount distribution (NFP) of exit light from the small diameter fiber in a case where the incident angle is 8°.
Figure 13:
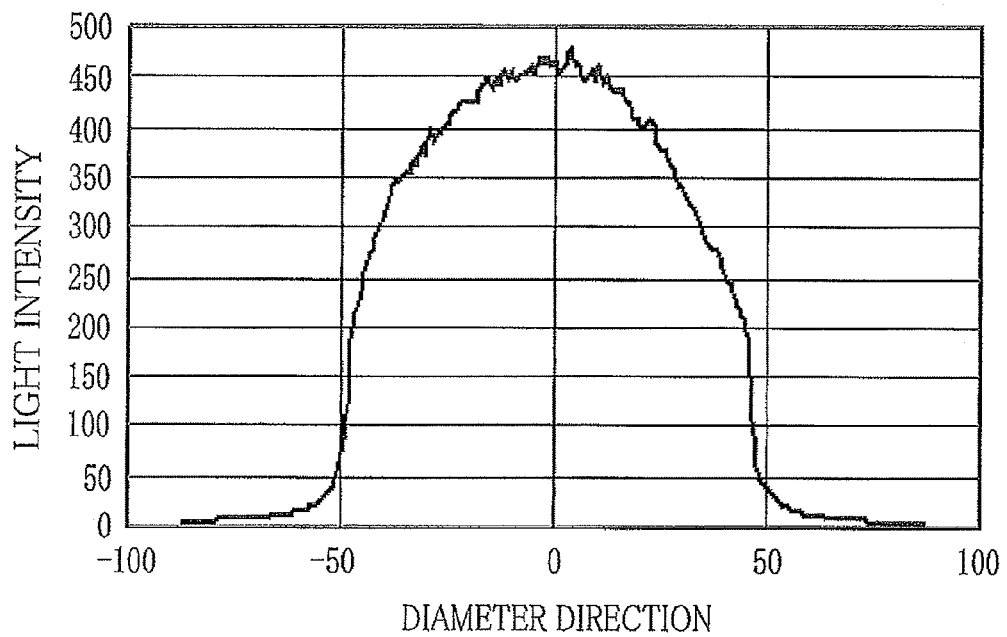
FIG. 13 shows a curve of light amount distribution (NFP) of exit light from the small diameter fiber in a case where the incident angle is 10°.
Figure 14:
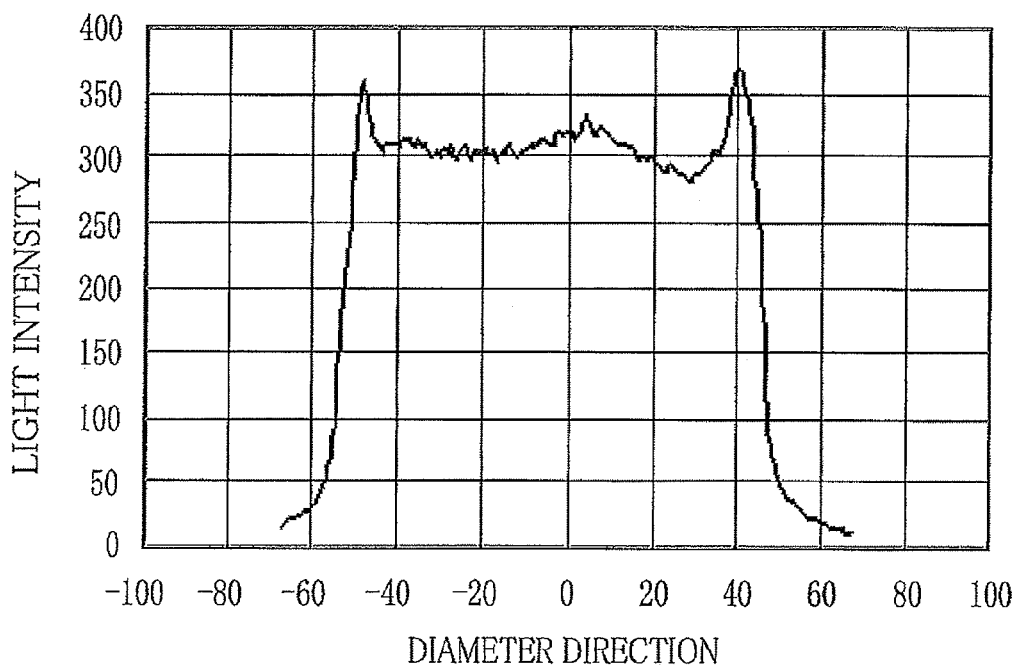
FIG. 14 shows a curve of light amount distribution (NFP) of exit light from the small diameter fiber in a case where the incident angle is 12°.

The small diameter fiber 22 of FIGS. 11 to 14 has the core diameter of 60 μm, the clad diameter of 80 μm, and the NA of 0.23. Each of FIGS. 11 to 14 shows a curve of the light amount distribution (NFP) of the exit light from the small diameter fiber 22. In FIG. 11, the incident angle θa is 6°. In FIG. 12, the incident angle θa is 8°. In FIG. 13, the incident angle θa is 10°. In FIG. 14, the incident angle θa is 12°. In FIGS. 11 to 14, "0" in the "diameter direction" (horizontal axis) indicates the optical axis of the small diameter fiber 22. To form a ring-shaped radiation pattern, it is preferable to set the NA of the optical fiber close to its upper limit.

As shown in FIGS. 11 to 14, the light amount in the peripheral portion of the small diameter fiber 22 in the diameter direction increases as θa increases from around 8°. It is known that the radiation pattern on the light exit surface of the small diameter fiber 22 changes in shape as θa changes, for example, from a ring-shape to an elliptical-shape and vice versa. Particularly, in a case where θa is 12°, the NA reaches the upper limit (0.22) of the optical fiber. Thereby, mode excitation in the peripheral portion of the radiation pattern becomes remarkable. Accordingly, the radiation pattern on the light exit surface of the small diameter fiber 22 becomes a ring-shape in a case where θa is 12°, significantly different from the radiation patterns with θa of less than 12°. In a case where θa is in a range from 0° to 6°, the light amount distribution of the exit light from the small diameter fiber 22 has substantially the same pattern (see FIG. 11) as in the case where θa is 6°.

Through the fiber connector 27, the exit light from the small diameter fiber 22 whose incident angle is θa enters the large diameter fiber 28 together with the exit light from the small diameter fibers 20 and 21 whose incident angles are 0°, and the exit light from the small diameter fiber 23 whose incident angle is 12°. Inside the large diameter fiber 28, the light from the small diameter fibers 20 to 23 are combined with each other, making the light amount uniform across the diameter direction of the large diameter fiber 28.

In a case where the incident angle θa of the small diameter fiber 22 is different from the incident angle 12° of the small diameter fiber 23, light having various radiation patterns different in size and shape enters the large diameter fiber 28, and is combined with each other in the large diameter fiber 28. Thereby, the exit light output from the exit surface of the light exit section 31 has the radiation pattern in which the multiple radiation patterns different in size and shape are combined and in which the light amount distribution is uniform. In other words, the light with the desired radiation pattern can be radiated to the object to be illuminated by adjusting the incident angle θa of the small diameter fiber 22. The light incident on the small diameter fibers 20 and 21 is gathered along and close to the optical axes X1 and X2 with the use of the condenser lenses 15 and 16, respectively, so the light amount becomes insufficient in the peripheral portion of the large diameter fiber 28 in the diameter direction. However, the light amount in the peripheral portion is increased by the adjustment of the incident angle θa of the light incident on the small diameter fiber 22 while the uniformity in the light amount distribution of the large diameter fiber 28 is not disturbed.

In the above embodiments, the large diameter fiber and the small diameter fibers or bundle fiber are connected, and the exit light is output from the large diameter fiber. Alternatively, the exit light may be directly output from the small diameter fibers without the use of the large diameter fiber. In this case, the small diameter fiber is provided with a light exit section as with the light exit section 31 of the first embodiment. A taper section composed of a tapered core and a tapered clad is provided on the light exit surface side of each small diameter fiber. The tapered clad covers an outer circumferential surface of the tapered core. A diameter of the tapered core decreases or tapers toward the light exit surface. An outer circumferential surface of the tapered clad is inclined to be tapered along the outer circumferential surface of the tapered core toward the light exit surface. The tapered clad is partly or entirely exposed to air to a predetermined depth from the light exit surface. The small diameter fiber is provided with a light passing space to pass or release the light leaked from the exposed tapered clad. Thus, the light leaked from the light passing space is output from the light exit section. Accordingly, the divergence angle and the NA of the light from the small diameter fiber are increased with the use of the tapered section and the light passing space.

In the case where the light is output from the small diameter fibers without the use of the large diameter fiber, it is preferable to use a bundle fiber of two wraps formed as described in the following. First, a small diameter fiber is wrapped in a first protection tube, which is used as a center fiber of the bundle fiber. Multiple small diameter fibers are disposed around the center fiber, and they are wrapped in a second protection tube. Around the second protection tube, other multiple small diameter fibers are disposed, and they are wrapped in a third protection tube. Thus, the bundle fiber of two wraps is formed. It should be noted that such bundle fiber or composite fiber of two or more wraps may be used.

Figure 15:
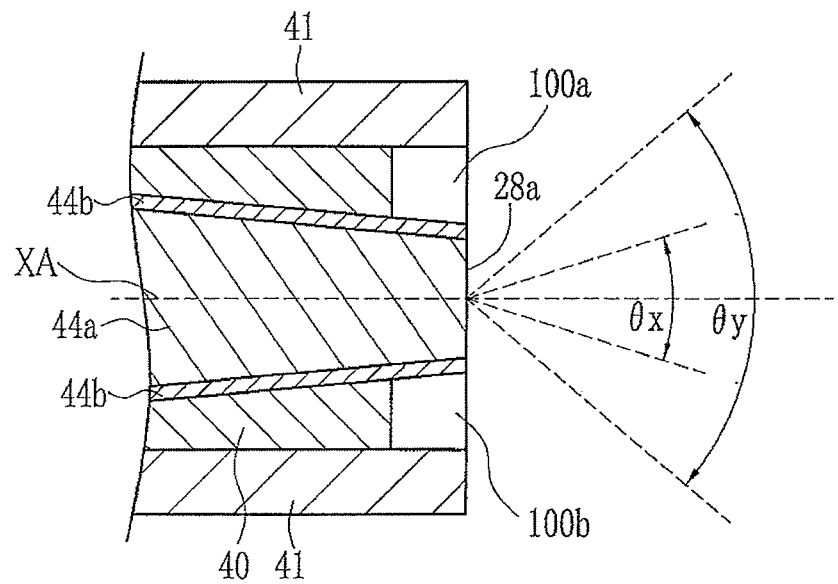
FIG. 15 is a cross-sectional view of another example of the light exit section.
Figure 16:
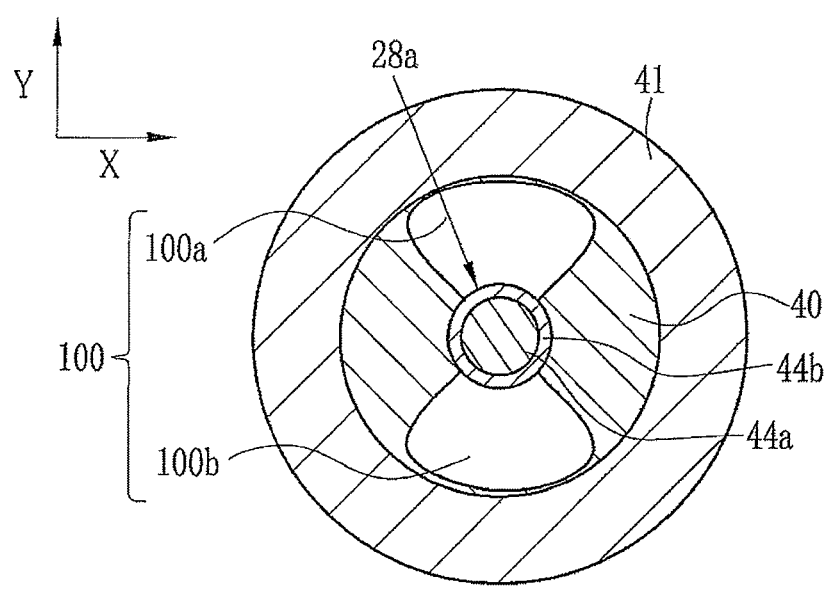
FIG. 16 is an end view of an end surface of the light exit section shown in FIG. 15.

The light passing space 48 of the first embodiment exposes the entire outer circumferential surface of the tapered clad 44b to air to a predetermined depth or distance from the light exit surface 28a, whereas a light passing space 100 or end opening is formed so as to partly expose the outer circumferential surface of the tapered clad 44b to air as shown in FIGS. 15 and 16.

The light passing space 100 is formed between the inner circumferential surface of the tubular housing 41 and the outer circumferential surface of the tapered clad 44b partly exposed to air to a predetermined depth from the light exit surface 28a. The light passing space 100 is composed of a first space 100a and a second space 100b when the light exit surface 28a of the large diameter fiber 28 is viewed in a two-dimensional plane of X and Y-axes. The first space 100a is provided above the tapered clad 44b (and the tapered core 44a) in the Y-axis direction. The second space 100b is provided below the tapered clad 44b (and the tapered core 44a) in the Y-axis direction. The first and second spaces 100a and 100b are in a tubular shape. The positions of the first and second spaces 100a and 100b are not limited to the above. The first and second spaces 100a and 100b may be provided on the right and left of the tapered clad 44b (and the tapered core 44a) in the X-axis direction. Methods for forming the first and second spaces 100a and 100b are the same as those described in the first embodiment except that the adhesive member 40 is partly removed, and the descriptions thereof are omitted.

As described above, with the use of the first and second spaces 100a and 100b, an area to be illuminated by the exit light containing light released from the first and second spaces 100a and 100b becomes larger in the Y-axis direction than in the X-axis direction. Therefore, as shown in FIG. 15, a divergence angle θy in the Y-axis direction becomes larger than a divergence angle θx in the X-axis direction. As a result, a radiation pattern of the exit light from the light exit section 31 becomes elliptical in shape. Changing depths of the first and second spaces 100a and 100b in the optical axis direction, the sizes of the first and second spaces 100a and 100b in the Y-axis direction, and the shapes of openings of the first and second spaces 100a and 100b through the exit surface of the light exit section 31 changes the divergence angle θy. Thereby, ellipticity or flattening ratio of the ellipsoidal radiation pattern can be adjusted.

Various changes and modifications are possible in the present invention and may be understood to be within the present invention.

What is claimed is:

1. A light source apparatus comprising:
   at least a first light source and a second light source;
   a first multimode optical fiber, with an acceptance angle θ, having a first light incident surface on which light from said first light source is incident and a first light exit surface for outputting first exit light, said first multimode optical fiber having a first core and a first clad covering an outer circumferential surface of said first core, said first core having a first tapered core whose diameter decreases toward said first light exit surface, said first clad having a first tapered clad whose outer circumferential surface is inclined to be tapered along an outer circumferential surface of said first tapered core toward said first light exit surface;
   a first condenser lens, disposed between said first light source and said first multimode optical fiber, having a first optical axis which is tilted at no less than 0° and no more than θ/2 relative to an optical axis of said first multimode optical fiber such that said first exit light has a convex light amount distribution having a higher light amount in the center portion than the peripheral portion thereof in a diameter direction of said first multimode optical fiber;
   a second multimode optical fiber, with an acceptance angle θ, having a second light incident surface on which light from said second light source is incident and a second light exit surface for outputting second exit light said second multimode optical fiber having a second core and a second clad covering an outer circumferential surface of said second core, said second core having a second tapered core whose diameter decreases toward said second light exit surface, said second clad having a second tapered clad whose outer circumferential surface is inclined to be tapered along an outer circumferential surface of said second tapered core toward said second light exit surface;
   a second condenser lens, disposed between said second light source and said second multimode optical fiber, having a second optical axis which is tilted at no less than θ/2 and no more than θ relative to an optical axis of said second multimode optical fiber such that said second exit light has a concave light amount distribution having a lower light amount in the center portion than the peripheral portion thereof in a diameter direction of said second multimode optical fiber; and
   a bundling section for bundling at least said first and said second light exit surface sides of said first and second multimode optical fibers to form a bundle surface of a bundle fiber; and
   a light exit section for outputting third exit light having a substantially uniform flat-top light distribution in its diameter direction as a result of said convex light amount distribution and said concave light amount distribution are being combined from said bundle fiber.

2. The light guide of claim 1, wherein a light incident surface of said first multimode optical fiber is inclined relative to a surface orthogonal to an optical axis of said first multimode optical fiber, and a light incident surface of said second multimode optical fiber is inclined relative to a surface orthogonal to an optical axis of said second multimode optical fiber, and an inclination angle of said light incident surface of said second multimode optical fiber is larger than an inclination angle of said light incident surface of said first multimode optical fiber.

3. The light guide of claim 2, wherein each of said first and said second multimode optical fibers has an acceptance angle θ, and said inclination angle of said first multimode optical fiber is not less than 0° and not more than θ/2, and said inclination angle of said second multimode optical fiber is not less than θ/2 and not more than θ.

4. The light source apparatus of claim 1, wherein a numerical aperture of each of said first and said second multimode optical fibers is not less than 0.2.

5. The light source apparatus of claim 1, wherein a total number of said first and said second multimode optical fibers is at most 19.

6. The light source apparatus of claim 1, wherein a diameter of each of said first and said second multimode optical fibers is not more than 1 mm.

7. A light source apparatus comprising:
   at least a first light source and a second light source;
   a first multimode optical fiber, with an acceptance angle θ, having a first light incident surface on which light from said first light source is incident and a first light exit surface for outputting first exit light;
   a first condenser lens, disposed between said first light source and said first multimode optical fiber, having a first optical axis which is tilted at no less than 0° and no more than θ/2 relative to an optical axis of said first multimode optical fiber such that said first exit light has a convex light amount distribution having a higher light amount in the center portion than the peripheral portion thereof in a diameter direction of said first multimode optical fiber;
   a second multimode optical fiber, with an acceptance angle θ, having a second light incident surface on which light from said second light source is incident and a second light exit surface for outputting second exit light;
   a second condenser lens, disposed between said second light source and said second multimode optical fiber, having a second optical axis which is tilted at no less than θ/2 and no more than θ relative to an optical axis of said second multimode optical fiber such that said second exit light has a concave light amount distribution having a lower light amount in the center portion than the peripheral portion thereof in a diameter direction of said second multimode optical fiber;

a bundling section for bundling at least said first and said second light exit surface sides of said first and second multimode optical fibers to form a bundle surface of a bundle fiber which outputs third exit light having a substantially uniform flat-top light distribution in its diameter direction as a result of said convex light amount distribution and said concave light amount distribution are being combined;

a large-diameter multimode optical fiber having a larger light incident surface than said bundle surface, said third exit light from said bundle fiber entering said light incident surface of said large-diameter multimode optical fiber, said large-diameter multimode optical fiber having a core and a clad covering an outer circumferential surface of said core, said core having a tapered core whose diameter decreases toward said light exit surface, said clad having a tapered clad whose outer circumferential surface is inclined to be tapered along an outer circumferential surface of said tapered core toward said light exit surface.

8. The light source apparatus of claim 7, wherein said large-diameter multimode optical fiber is provided with a speckle reducer which reduces speckle of light to be output from said large-diameter multimode optical fiber.

9. The light source apparatus of claim 7, further comprising:

a tubular housing through which said large-diameter multimode optical fiber is inserted; and a transparent adhesive member provided between said housing and an outer circumferential surface of said clad, said adhesive member retaining said large-diameter multimode optical fiber in said housing, said adhesive member having a lower refractive index than said clad, said adhesive member having a light passing space hollowed out to a predetermined depth from said light exit surface so as to expose at least a part of said outer circumferential surface of said tapered clad to air.

* * * * *